United States Patent

[11] 3,579,281

[72] Inventors George H. Kam
Tonawanda;
Richard J. Hughes, Williamsville,, N.Y.

[21] Appl. No. 830,290
[22] Filed June 4, 1969
[45] Patented May 18, 1971
[73] Assignee Sylvania Electric Products Inc.

[54] COMBINING NETWORK PROVIDING COMPENSATED TUNING VOLTAGE FOR VARACTOR
9 Claims, 7 Drawing Figs.

[52] U.S. Cl. .................................................... 332/30V, 307/320, 331/36C, 331/177V
[51] Int. Cl. .................................................... H03c 3/22
[50] Field of Search .................................................... 332/16, 167, 301; 331/11, 23, 36 (C), 127 (U), 25, 18; 307/320; 334/15

[56] References Cited

UNITED STATES PATENTS

| | | | |
|---|---|---|---|
| 3,191,130 | 6/1965 | Rudd et al. | 332/30VX |
| 3,192,491 | 6/1965 | Hesselberth et al. | 334/15X |
| 3,227,968 | 1/1966 | Brounley | 331/177VX |
| 3,353,117 | 11/1967 | Renkowitz | 332/30VX |
| 3,401,353 | 9/1968 | Hughes | 331/25X |

*Primary Examiner*—Alfred L. Brody
*Attorneys*—Norman J. O'Malley, Elmer J. Nealon and Edward J. Coleman

ABSTRACT: A control circuit for an indirect frequency synthesizer which combines a plurality of control functions into a single compensated tuning voltage for the varactor control element of an associated voltage controlled oscillator. The combining circuit includes a resistor network for summing phase control and modulating signals, and a variable resistance circuit for generating a coarse steering signal. The summing network is resistively connected to the variable resistance circuit to form a variable impedance resistor divider operative to attenuate the combined phase control and modulating signals in a manner inversely related to the magnitude of the coarse steering signal and to combine the attenuated control signals with the coarse steering signal and to combine the attenuated control signals with the coarse steering voltage to provide the varactor tuning signal. More specifically, the attenuation provided by the impedance divider is operative to substantially compensate for the variation in voltage versus frequency sensitivity of the varactor with changes in the coarse steering voltage.

2 Sheets-Sheet 1

INVENTORS.
Richard J. Hughes and
BY George H. Kam
Edward J. Coleman
AGENT.

INVENTORS.
Richard J. Hughes and
BY George H. Kam
Edward J. Coleman
AGENT.

COMBINING NETWORK PROVIDING COMPENSATED TUNING VOLTAGE FOR VARACTOR

BACKGROUND OF THE INVENTION

This invention relates generally to control circuits and, more particularly, to a control signal combining network for providing a single compensated tuning voltage for a varactor control element.

The present invention is suitable for a variety of control voltage combining applications, however, it is particularly useful in the control circuit of an indirect frequency synthesizer. A typical indirect digital frequency synthesizer comprises a voltage controlled oscillator (VCO) adapted to be controlled in phase and frequency, a digital phase detector, a variable frequency divider in a feedback path from the oscillator output to one input of the phase detector, a reference frequency signal source connected to the other input of the phase detector and a low pass filter connected between the phase detector output and the control element of the oscillator. If there is a phase difference between the reference signal and the feedback signal, the phase detector generates an error signal which is applied via the low pass filter to phase correct the oscillator to achieve phase lock with the reference signal. Different output frequencies are selected by changing the feedback path frequency division ratio.

In addition to the above mentioned elements, the synthesizer requires some means to coarse tune the frequency of the voltage controlled oscillator to within a range that will allow the phase detector to pull the system into phase lock. One coarse tuning technique employs a manually adjusted resistor matrix to provide a frequency error correction voltage to the oscillator control element. Another approach is to use an automatic coarse tuning loop such as that described in U.S. Pat. No. 3,401,353 issued Sept. 10, 1968, and assigned to the assignee of the present application.

If it is desired to frequency modulate the output signal of the synthesizer, an audio modulating signal can also be applied directly to the oscillator control element.

Accordingly, there are applications where a total of three control signals may be applied to the control element of the synthesizer oscillator, namely, a coarse steering voltage, a phase control voltage and a modulating signal. Control of the oscillator phase and frequency is normally provided by one or more variable reactance devices in the oscillator tank circuit. A particularly useful device for this application is the so-called varactor, a semiconductor diode designed for low loss at high frequencies with a voltage variable capacitance. A conventional circuit arrangement for responding to the three mentioned control signals employs three varactors in a series parallel combination. The coarse steering and phase control signals are applied as respective tuning voltages to the series connected varactors, and the audio modulating signal is applied as a tuning voltage to a parallel connected varactor. This arrangement results in a rather complex and critical tuning circuit subject to cross coupling problems and excessive variation of the frequency modulation deviation between the high and low ends of each oscillator frequency band.

The use of a simple resistive adder with fixed attenuation to combine the three control signals and thereby simplify the varactor control circuit is also unsatisfactory due to the change in varactor frequency sensitivity as a function of the applied tuning voltage. Typically, with a 10:1 voltage tuning ratio, the varactor sensitivity will change about 9:1. This will cause the phase locked loop gain to change by a factor of nine, resulting in an increase in the magnitude of oscillator spurious signals and a rise in closed loop gain to the point where the loop may become unstable. In addition, the frequency modulation deviation will vary by the same ratio between the extreme ends of the oscillator frequency band.

SUMMARY OF THE INVENTION

With an awareness of the aforementioned disadvantages of the prior art, it is an object of the present invention to provide an improved control signal combining network.

It is another object of the invention to provide a network for combining a plurality of control signals into a single compensated tuning voltage for a varactor control element.

Briefly, these objects are attained by a combining network comprising a source of first control signal, variable means for generating a second control signal, and means connecting the first control signal source to the second control signal generating means to form a variable impedance divider operative to attenuate the first control signal in a manner inversely related to the magnitude of the second control signal and to combine the attenuated first control signal with the second control signal.

BRIEF DESCRIPTION OF THE DRAWINGS

This invention will be more fully described hereinafter in conjunction with the accompanying drawings, in which.

DESCRIPTION OF PREFERRED EMBODIMENT

For a better understanding of the present invention, together with other and further objects, advantages and capabilities thereof, reference is made to the following disclosure and appended claims in connection with the above-described drawings.

Figure 1:
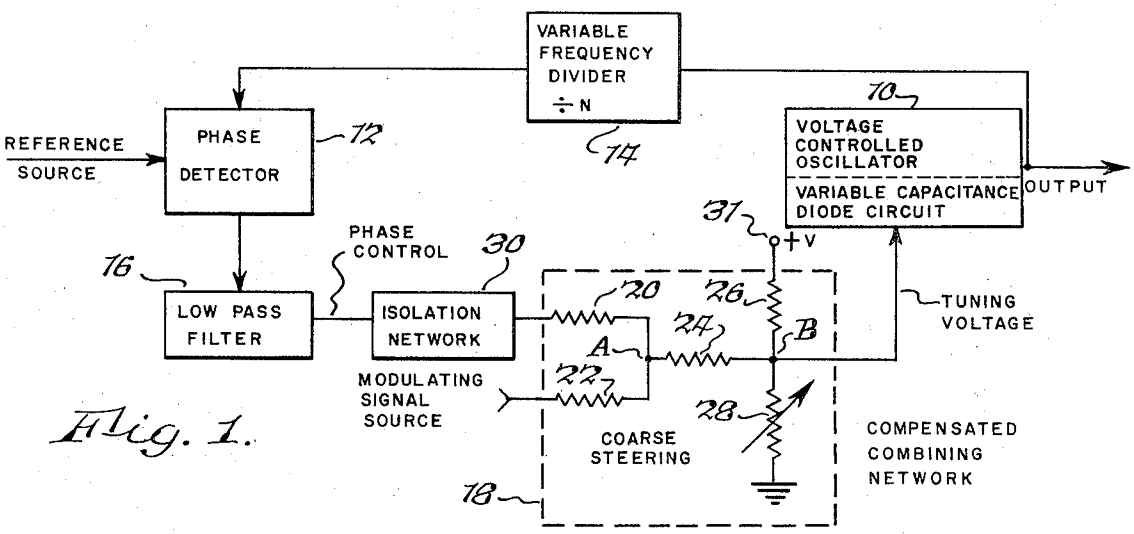
FIG. 1 is a combined block diagram and circuit schematic of an indirect frequency synthesizer including a compensated combining network in accordance with the invention.

FIG. 1 shows an indirect frequency synthesizer which is quite typical, other than for the compensated combining network which is in accordance with the present invention. The synthesizer comprises a voltage controlled oscillator (VCO) 10 adapted to be controlled in phase and frequency, a phase detector 12, a variable frequency divider 14 ( N) connected in the feedback path from the oscillator output to one input of the phase detector, a reference frequency signal source connected to the other input of phase detector 12, and a low pass filter 16 connected at the output of the phase detector. The output of filter 16 is coupled through circuit means in accordance with the invention to a control element in oscillator 10, which for purposes best applying the present invention comprises a varactor circuit. When the loop is phase locked, the frequency of the feedback signal applied to the phase detector is equal to the reference frequency. The variable divider 14 divides the oscillator frequency by a number N; thus, the output of VCO 10 must be N times the reference frequency in order for the feedback frequency to be equal to the reference frequency. Consequently, the frequency of the VCO can be set to any multiple of the reference frequency by changing the division ratio of divider 14. If there is a phase difference between the reference and feedback signals, the phase detector generates a proportional direct current voltage signal which is applied via low pass filter 16 as a phase control signal to correct the VCO towards the phase locked condition and the desired synthesizer frequency output.

In order to provide for wide frequency excursions which take the VCO out of its capture range, a variable means for generating a coarse tuning voltage is included in the synthesizer, as will be discussed hereinafter, to steer the VCO frequency within a range that will allow the phase detector to pull the system into phase lock. The synthesizer of FIG. 1 is also adapted to provide a frequency modulated output by responding to a third control function, a modulating signal applied directly to the oscillator control element.

In accordance with the present invention, a combining network 18 is provided for summing these three control signals in a manner providing a single tuning voltage which is compensated for the nonlinear sensitivity characteristics of the varactor control element in oscillator 10. As generally illustrated in FIG. 1, network 18 comprises fixed resistors 20, 22, 24 and 26, and a variable resistor 28. The phase control signal at the output of low pass filter 16 is coupled through an isolation network 30 and resistor 20 to a junction point A, and a resistor 22 is connected between junction point A and the modulating signal source. Accordingly, resistors 20 and 22 function as a summing network, and the sum of the phase control and modulating voltages is available at junction point A. Network 30 is connected in the phase control path to isolate the current loading of the resistor combining network from the loop filter.

The coarse steering voltage is generated by the circuit comprising a fixed resistor 26 and variable resistor 28 serially connected in that order between a regulated direct current voltage source, represented by terminal 31, and a source of reference potential, or ground. The desired coarse steering voltage is provided at the junction of resistors 26 and 28, denoted as point B, by appropriate adjustment of the variable resistance 28. The summed phase control and modulating voltages at junction point A are connected via resistor 24 to junction point B to thereby be combined with the coarse steering voltage. Resistor 24 functions as a resistor divider in series with the parallel impedance combination of resistor 26 and variable resistance 28, and as will now be described, the variable impedance divider thus formed by resistors 24, 26 and 28 is operative to compensate for the change in voltage versus frequency sensitivity of the varactor tuned circuit in oscillator 10 over the coarse steering tuning range.

Figure 2:
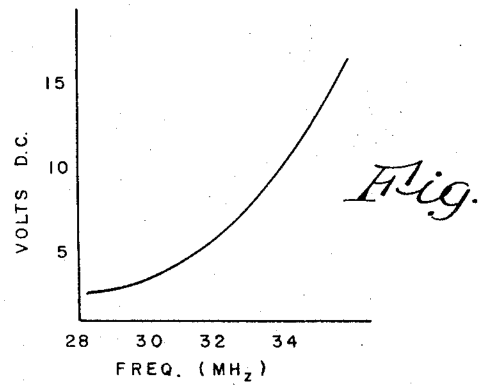
FIG. 2 shows a typical voltage versus frequency curve for a varactor tuned circuit used in a voltage controlled oscillator.

FIG. 2 shows a typical voltage versus frequency curve for the varactor tuned circuit used in oscillator 10. Once the values of resistors 20, 22, 24 and 26 are established, the values of each of the coarse tuning resistance settings are selected to match this curve. More specifically, for high varactor steering voltages, where the voltage versus frequency sensitivity is at a minimum, the resistance value of the variable coarse steering resistor 28 is set to be much larger than the value of resistor 26, resulting in a minimum voltage division, or attenuation, of the phase control and modulating voltages. For low varactor voltages, where the voltage versus frequency sensitivity is at a maximum, coarse steering resistor 28 is set at a value much lower than that of resistor 26, resulting in maximum voltage division, or attenuation, of the phase control and modulating voltages. Thus, the variable impedance divider comprising resistors 24, 26 and 28 is operative to attenuate the phase control and modulating signals in a manner inversely related to the magnitude of the coarse steering voltage. In addition, the divider combines these attenuated signals with the coarse steering voltage to provide a single compensated tuning voltage at junction point B, which is connected to the varactor control circuit of oscillator 10. Accordingly, the nonlinear slope change characteristics of the varactor tuned circuit are compensated for by resistively combining the phase control and modulating voltages with the variable coarse steering generator so as to form an impedance changing resistor divider. As a result, the VCO control circuitry is simplified and the frequency modulation deviation across the VCO frequency band is significantly reduced. Further, the spurious signal and closed loop gain problems are substantially minimized.

Figures 3, 6:
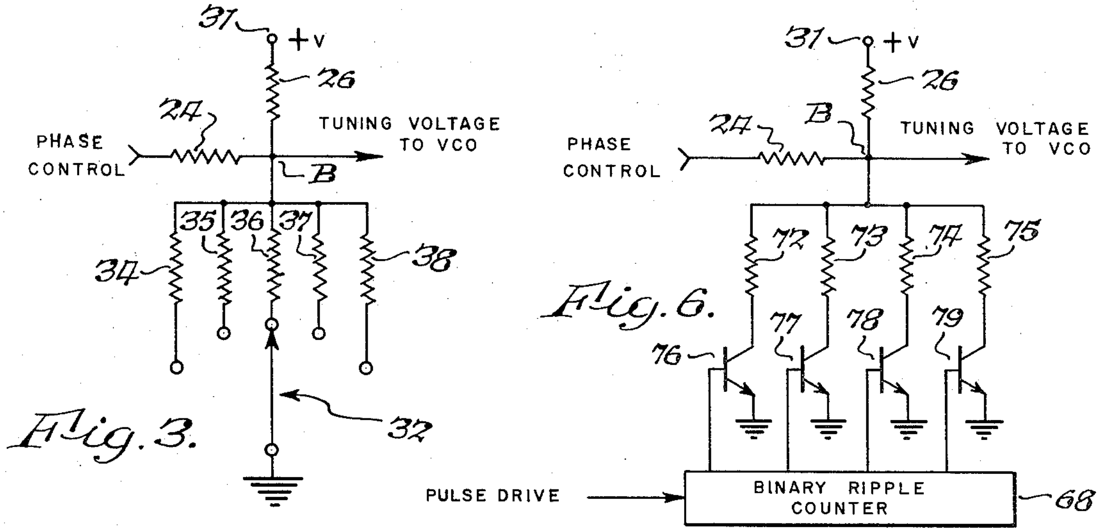
FIG. 3 is a schematic diagram of a combining network including a selectively switched resistor matrix in accordance with the invention.
FIG. 6 is a combined circuit schematic and block diagram of a combining network having a transistor controlled resistor matrix responsive to the outputs of a binary counter driven similarly to that employed in the automatic coarse tuning system of FIG. 5.

FIGS. 3, 4, 6 and 7 show variations of combining network 18 and, for purposes of simplification, illustrate combination of only the phase control and coarse steering signals. The variation shown in FIG. 3 is quite similar to combining network of FIG. 1 except that the function of variable resistor 28 is provided by a selectively switched resistor matrix. More specifically, the variable resistance comprises a single-pole five-position switch 32, having a common terminal connected to ground, and a set of five different valued resistors 34—38 each connected between junction point B and a respective position terminal of switch 32. Coarse steering in five steps of a selected frequency increment is achieved by manually operating switch 32 to select one of the resistors 34—38 to be connected between junction point B and ground. Coarse steering may be accomplished in finer frequency increments by increasing the number of resistors and switch positions connected between junction point B and ground, thereby more closely matching the nonlinear sensitivity curve of the varactor circuit.

Figure 4:
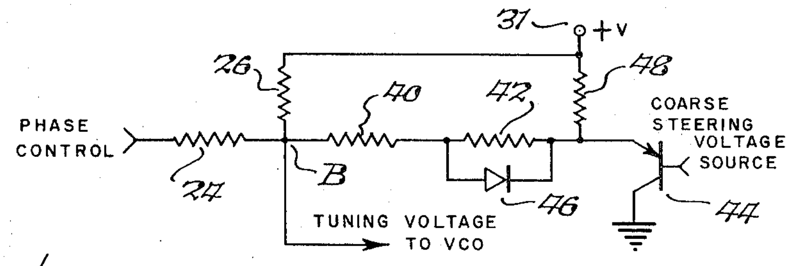
FIG. 4 is a schematic diagram of a combining network responsive to an automatic coarse steering voltage to provide two states of attenuation in accordance with the invention.

FIG. 4 shows a variation of combining network 18 wherein the variable resistance provides two states of attenuation in response to a variable coarse steering voltage source. In this instance, variable resistor 28 is replaced by a series combination comprising resistors 40 and 42 and PNP transistor 44 connected in that order between junction point B and ground. A diode 46 is connected across resistor 42 with its cathode connected to the emitter electrode of the transistor. The emitter of transistor 44 is also connected through a bias resistor 48 to the regulated voltage terminal 31; the transistor collector is connected to ground; and the transistor base, employed as the control electrode, is connected to a variable voltage source. For example, the circuit of FIG. 4 may be employed with an automatic coarse tuning system such as that shown in FIG. 5, to be described hereinafter, with the coarse steering signal from the digital to analog converter being applied to the base of transistor 44.

As previously mentioned, the circuit of FIG. 4 is responsive to the coarse steering voltage to provide one point of change in the attenuation of the phase control voltage applied via resistor 24 to junction point B. The steering voltage is buffered by transistor 44 to provide a low impedance source for the nonlinear attenuator matrix. As illustrated in FIG. 2, the coarse steering voltage typically changes from one to fifteen volts, with the greatest VCO sensitivity appearing below about four volts. At steering voltages greater than four volts, the circuit comprising resistors 26, 40 and 42 carries a current such that the voltage drop across resistor 42 is less than that needed to cause diode 46 to conduct. Thus, the effective attenuation of the phase control signal at junction point B is approximately equal to the sum of the values of resistors 40 and 42 divided by the sum of the values of resistors 26, 40 and 42. Below a steering voltage of four volts, diode 46 will conduct, thereby shorting out resistor 42 and increasing the attenuation of the phase control voltage at junction B to approximately the value of resistor 40 divided by the sum of the values of resistors 26 and 40. The change in sensitivity of the phase control voltage at junction B can thus be controlled by adjusting the values of resistors 40 and 42. A 10:1 change in sensitivity can easily be accomplished. Resistor 26 provides a means of adjusting the point where the attenuation of the phase control signal changes. The resultant output of this network is a voltage at junction B representing the coarse steering voltage with the phase control voltage added in two levels of attenuation as a function of the coarse steering voltage applied to the base of transistor 44.

Figure 5:
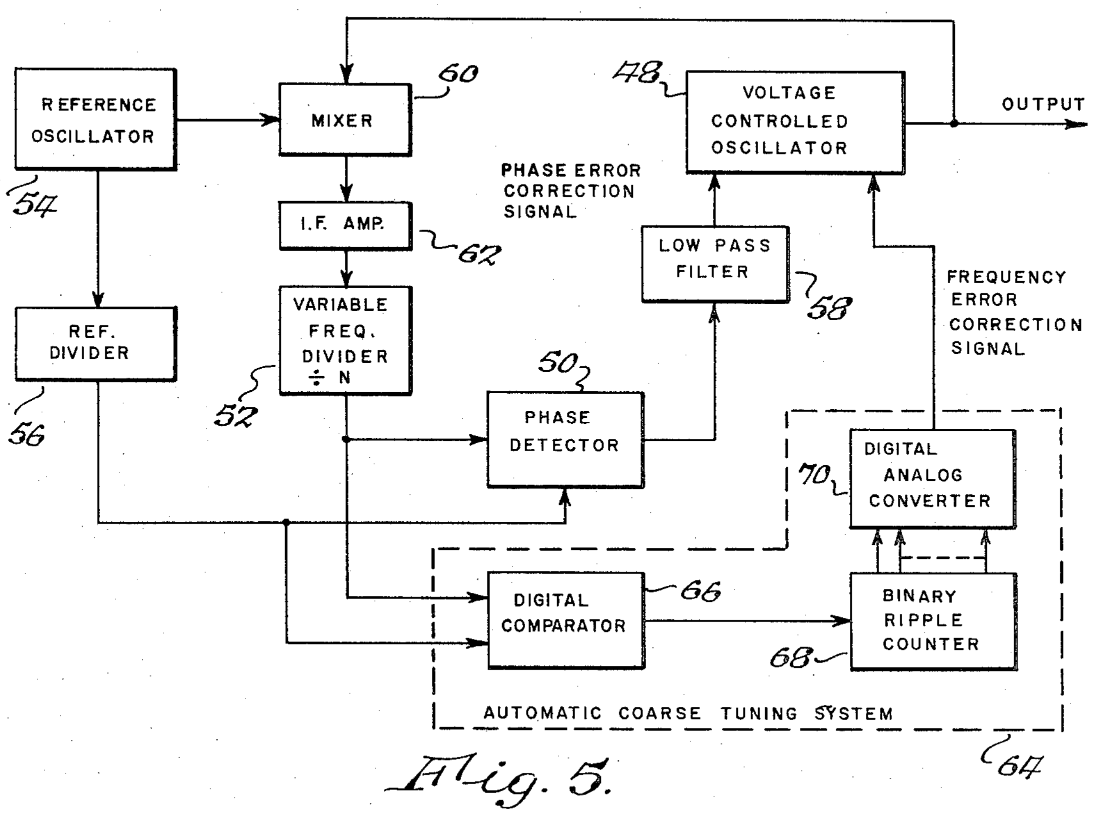
FIG. 5 is a block diagram of an indirect frequency synthesizer including an automatic coarse tuning system in accordance with U.S. Pat. No. 3,401,353.

FIG. 5 shows an indirect frequency synthesizer including an automatic coarse tuning system in accordance with U.S. Pat. No. 3,401,353, which is assigned to the assignee of the present invention. This synthesizer will now be briefly described to enable a better understanding of the application of the control signal combining network variations illustrated by FIGS. 6 and 7. The synthesizer of FIG. 5 comprises a voltage controlled oscillator (VCO) 48 adapted to be controlled in phase and frequency, a phase detector 50, a variable frequency divider 52 ( N) connected in the feedback path from the oscillator output to one input of the phase detector, a reference frequency signal source consisting of an oscillator 54 and divider 56 which is connected to the other input of phase detector 50, and a low pass filter 58 connected between the phase detector output and the control element of the oscillator. In this instance, the feedback signal from the VCO is down converted prior to application to the variable frequency divider 52. In particular, the VCO output is connected to a mixer 60 along with the output of reference oscillator 54. The frequency difference between the reference oscillator and VCO feedback signal is then coupled to divider 52 through a relatively narrowband intermediate frequency (IF) amplifier 62. The reference oscillator and VCO output signals are both pulse trains; hence, variable divider 52 may comprise a binary ripple counter which is driven by the intermediate frequency pulse train from mixer 60. The down converted and divided output of circuit 52 is then applied as the feedback signal to phase detector 50. The reference divider 56 may also comprise a binary ripple counter, in which case it is driven by the pulse train from reference oscillator 54.

To enable proper operation with the coarse tuning system, phase detector 50 is preferably of the commonly employed digital type which corrects the VCO toward a settled phase lock mode wherein the feedback pulses are interlaced in time with the reference pulses in an alternating one-to-one manner. When the phase control loop is phase locked, the frequency of the feedback signal applied to the phase detector is equal to the reference frequency provided by divider 56. The variable divider 52 divides the intermediate frequency from mixer 60 by a number N; thus, the output of mixer 60 must be N times the reference frequency in order for the feedback frequency to be equal to the reference frequency. Consequently, the frequency of the VCO less the frequency of reference oscillator 54 (i.e. the intermediate frequency from mixer 60) can be set to any multiple of the reference frequency from divider 56 by changing the division ratio of divider 52. If there is a phase difference between the reference and feedback signals, the phase detector generates a proportional direct current voltage which is applied via low pass filter 58 as a phase error correction signal to the VCO to steer it towards the phase locked condition and the desired synthesizer frequency output.

In order to provide for wide frequency excursions which take the VCO out of its capture range, an automatic coarse tuning system 64 is included in the synthesizer to steer the VCO frequency within a range that will allow the phase detector to pull the system into phase lock. The coarse tuning system 64 comprises a digital comparator 66 having a first input connected to the feedback output of the variable divider 52, and a second input connected to the reference signal output of divider 56. The output of comparator 66 is connected to the pulse drive input of a binary ripple counter 68. The parallel outputs of the stages of counter 68 are connected to a digital to analog converter 70, which consists of an arrangement of weighted resistors for converting each state of the counter to a corresponding analog voltage. Hence, the digital to analog converter will be operative to generate a set of voltage levels each of which corresponds to the digital number stored in the counter at that instant in time. These voltage levels are applied as a frequency error correction (coarse steering) signal to a control element of VCO 48.

As previously noted, in the phase lock mode of the feedback and reference pulses are interlaced in time in an alternating one-to-one manner. Consequently, the digital comparator 66 operates to generate output pulses when the feedback and reference pulses are not so interlaced and to provide no pulse output when the feedback and reference signals are interlaced. The binary ripple counter is unidirectional so that when continuously driven by the output pulses from the comparator 66 it causes the digital to analog converter to generate a cyclic staircase waveform. The number of voltage level increments comprising each cycle is determined by the length of the binary counter, and the amplitude of this staircase waveform determines the frequency tuning range of the system.

Referring now to FIG. 6, a combining network is illustrated in which the variable resistance function (analogous to resistor 28) is provided by a set of resistors electronically switched according to a binary sequence, such as may be developed in an automatic coarse tuning system similar to that shown in FIG. 5. More specifically, the variable resistance means comprises four resistance circuits each including a resistor and NPN transistor serially connected between junction point B and ground. Each of the resistors, designated 72—75, has a weighted value twice that of the resistor connected to its right, and each of the transistors, respectively designated 76—79, has a collector electrode connected to its respective resistor and an emitter electrode connected to ground. The bases, or control electrode, of transistors 76—79 are respectively connected to the parallel outputs of a binary ripple counter 68, analogous in function to the counter employed in the automatic coarse tuning system of FIG. 5. Hence, the binary counter has a pulse drive input which may be obtained from a source such as the digital comparator 66. In this manner, selected ones of the transistors 76—79 are rendered conducting in response to the digital number contained in counter 68. Accordingly, selected combinations of the weighted resistors 72—75 are thereby connected between junction point B and ground, the digital number in counter 68 and thus the resistor selection process being variable in response to the input pulses applied to the counter. In this manner, the coarse steering voltage at point B will be appropriately varied, and the phase control signal applied via resistor 24, obtainable from the output of low pass filter 58 in FIG. 5, will be attenuated as a function of coarse tuning. The number of resistor-transistor combinations connected between junction point and ground may be increased to make available additional fine increment frequency steps in order to provide a better match to the nonlinear sensitivity curve of the varactor circuit.

Figure 7:
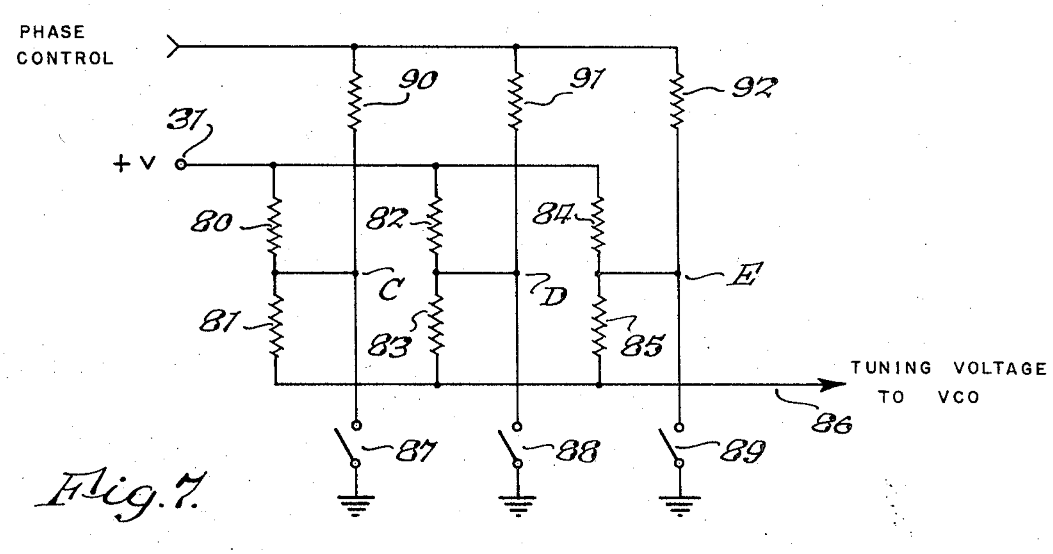
FIG. 7 is a circuit schematic of a combining network including a digital to analog converter employed similarly to that used in the automatic coarse tuning system of FIG. 5.

Another approach for combining an automatic coarse tuning voltage with a phase detector fine tuning voltage to provide a compensated control signal is shown in FIG. 7. The resistor matrix formed by resistors 80—85 connected between the regulated direct current voltage source 31 and a summing bus 86 represents a digital to analog converter analogous to the converter 70 employed in the automatic coarse tuning loop of FIG. 5. The digital input to the converter is provided by the set of switches 87—89, which represent the stages of the binary ripple counter 68. Resistor 80 is connected to the counter output represented by switch 87, at junction point C; resistor 82 is connected to counter output, represented by switch 88, at junction point D; and resistor 84 is connected to switch 89 at junction point E. As illustrated, each of the switches 87—89 are operative when closed to connect the respective junction points C, D and E to ground. The set of resistors 81, 83 and 85 are respectively connected between junction points C, D and E to the summing bus 86. The phase control signal, obtainable at the output of low pass filter 58 in FIG. 5, is added to the digital to analog converter matrix through the set of resistors 90, 91 and 92 which are respectively connected to the junction points C, D and E.

The values of resistors 80, 82 and 84 are weighted as a function of their significance in the matrix output. In particular, each of these resistors has a value twice that of the resistor connected to the less significant stage of the counter. For example, if the value of resistor 84 were 1,000 ohms, the values of resistors 82 and 80 would be 2,000 and 4,000 ohms, respectively. The values of resistors 90, 91 and 92 are respectively proportional to the values of resistors 80, 82 and 84; for example, resistors 92, 91 and 90 may have values of 10,000 ohms, 20,000 ohms and 40,000 ohms respectively.

As the switches 87—89 are closed in a binary sequence, the amount of phase control voltage to be added to the matrix is reduced by shorting out the resistors in series with the phase control voltage at junction points C, D and E. The resultant output to the VCO from the phase control voltage will vary piecewise linearly as a function of the digital to analog output level. As the voltage from the matrix is reduced, the VCO tuning due to phase control is reduced. The overall VCO sensitivity to the phase control voltage remains almost constant for all coarse steering voltages. Hence, with reference to the automatic coarse tuning system of FIG. 5, the circuit of FIG. 7 may be described as a digital converter connected at the parallel outputs of a binary ripple counter (represented by switches 87—89) for generating as the coarse steering signal a voltage level corresponding to the digital number stored in the counter at that instant in time, the coarse steering signal voltage level being variable in response to input pulses applied to the counter. Resistors 90, 91 and 92 provide the means for combining the phase control voltage with the coarse steering voltage so as to form a variable impedance divider operative to attenuate the phase control voltage and thus compensate for the sensitivity variations of the varactor tuned circuit with changes in the steering voltage level. The resulting single compensated tuning voltage for the VCO is provided on summing bus 86.

In summary, the present invention provides a compensated control voltage combining network in a variety of embodiments adapted to either manual or automatic coarse steering control. The network significantly simplifies the controlled tuning circuitry and substantially minimizes the adverse effects attendant with varactor nonlinear sensitivity characteristics. Although illustrated as used in an indirect frequency synthesizer, it is contemplated that the tuning voltage combining network may be employed in a variety of applications.

We claim:

1. A combining network for providing a compensated tuning voltage comprising, in combination, a source of first control signal, variable means for generating a second control signal, and means connecting said first control signal source to said second control signal generating means whereby said connecting means and said generating means form a variable impedance divider operative to attenuate said first control signal in a manner inversely related to the magnitude of said second control signal and to combine said attenuated first control signal with said second control signal.

2. A combining network in accordance with claim 1 wherein said connecting means and said means for generating a second control signal are resistive, said combined signals are applied as a tuning voltage for a tunable variable capacitance diode circuit, said second control signal is a coarse steering voltage, and said variable impedance divider is operative to substantially compensate said first control signal for the variation in voltage versus frequency sensitivity of said diode with changes in said coarse steering voltage.

3. A combining network in accordance with claim 2 wherein said variable means for generating a second control signal comprises a binary counter having a pulse drive input and a set of parallel outputs from which the digital number contained in said counter can be read, and a digital to analog converter connected at the outputs of said counter for generating as said second control signal a voltage level corresponding to the digital number stored in the counter at that instant in time, said second control signal voltage level being variable in response to input pulses applied to said counter.

4. A combining network in accordance with claim 3 and wherein said digital to analog converter comprises a source of direct current voltage, a summing bus, a first set of resistors each connected between said direct current voltage source and a respective one of the outputs of said counter, each of said first set of resistors having a value twice that of the resistor connected to the next less significant stage of said counter, and a second set of resistors respectively connected between the junctions of said first set of resistors with said counter outputs and said summing bus, and wherein said connecting means comprises a third set of resistors each connected between said first control signal source and a respective one of the junctions of said first set of resistors with said counter outputs, each of said third set of resistors having a value proportional to the value of the first set resistor to which it is connected.

5. A combining network in accordance with claim 2 wherein said variable means for generating a second control signal comprises a source of direct current voltage, a source of reference potential, and a first resistor and a variable resistance means serially connected in that order between said direct current voltage source and said source of reference potential, and wherein said connecting means comprises a second resistor connected between said first control signal source and the junction of said first resistor with said variable resistance means, said combined signal tuning voltage being available at said junction.

6. A combining network in accordance with claim 5 wherein said variable resistance means comprises a multiposition switch connected to said source of reference potential, and a set of resistors each connected between the junction of said first and second resistors and respective position terminal of said switch, each of said set of resistors having a different value and said switch being operative to selectively connect one of said set of resistors to said source of reference potential.

7. A combining network in accordance with claim 5 wherein said variable resistance means comprises a plurality of resistance circuits each including a resistor and transistor serially connected between the junction of said first and second resistors and said source of reference potential, each of said transistors having a control electrode, and a binary counter having a pulse drive input and a set of parallel outputs respectively connected to the control electrodes of said transistors whereby selected ones of the said transistors are rendered conducting in response to the digital number contained in said counter, said digital number and thus the selection of conducting transistors being variable in response to input pulses applied to said counter.

8. A combining network in accordance with claim 5 wherein said variable resistance means comprises third and fourth resistors and a transistor serially connected in that order between the junction of said first and second resistors and said source of reference potential, said transistor having a control electrode, a variable voltage source connected to the control electrode of said transistor, and a diode connected across said fourth resistor.

9. A combining network in accordance with claim 2 wherein said variable means for generating a second control signal comprises a source of direct current voltage, a source of reference potential, and a first resistor and a variable resistance means serially connected in that order between said direct current voltage source and said source of reference potential, wherein said first control signal is a phase control voltage, and wherein said connecting means comprises second and third resistors connected between said phase control voltage source and the junction of first resistor with said variable resistance means, and further including a modulating signal source connected through a fourth resistor to the junction of said second and third resistors, said variable impedance divider being operative to attenuate said phase control voltage and said modulating signal in a manner inversely related to the magnitude of said second control signal and to combine said attenuated phase control and modulating signals with said second control signal, said combined signal turning voltage being available at the junction of first resistor with said variable resistance means.